(12) United States Patent
Berger et al.

(10) Patent No.: US 7,044,148 B2
(45) Date of Patent: May 16, 2006

(54) APPARATUS AND METHOD FOR SELECTIVELY SECURING A VALVE IN AN OPEN OR CLOSED POSITION

(75) Inventors: James Jacob Berger, Brighton, CO (US); Steven A. Berger, Grand Junction, CO (US)

(73) Assignee: Sabber Design & Manufacturing, Grand Junction, CO (US)

( * ) Notice: Subject to any disclaimer, the term of this patent is extended or adjusted under 35 U.S.C. 154(b) by 48 days.

(21) Appl. No.: 10/788,638

(22) Filed: Feb. 27, 2004

(65) Prior Publication Data

US 2004/0226611 A1    Nov. 18, 2004

Related U.S. Application Data

(60) Provisional application No. 60/451,098, filed on Feb. 28, 2003.

(51) Int. Cl.
*F16K 35/00* (2006.01)
(52) U.S. Cl. .................. 137/15; 137/382; 137/385; 70/179; 70/180
(58) Field of Classification Search ............... 137/15, 137/382, 385; 70/179, 180
See application file for complete search history.

(56) References Cited

U.S. PATENT DOCUMENTS

| | | | |
|---|---|---|---|
| 725,290 A | | 4/1903 | Speer |
| 812,021 A | * | 2/1906 | Dahl ............................ 70/180 |
| 961,959 A | * | 6/1910 | Herfurth ...................... 137/382 |
| 1,158,631 A | * | 11/1915 | Caldwell ..................... 70/180 |
| 3,156,256 A | * | 11/1964 | Weaver ........................ 137/385 |
| 4,300,373 A | | 11/1981 | Camos et al. ................. 70/232 |
| 4,397,332 A | * | 8/1983 | Sample ........................ 137/385 |
| 4,449,694 A | | 5/1984 | Hobart et al. ................ 251/171 |
| 4,513,773 A | * | 4/1985 | Hardiman, Jr. ............. 137/382 |
| 4,781,044 A | | 11/1988 | Ortega ......................... 70/177 |
| 5,165,263 A | | 11/1992 | Perron et al. ................. 70/177 |
| 5,353,833 A | | 10/1994 | Martinez .................... 137/385 |
| 5,360,036 A | | 11/1994 | Kieper ................... 137/625.22 |

(Continued)

OTHER PUBLICATIONS

"Secure Backflow Preventers: Sabber-Lock": *dw & bp Technology Update*; Apr. 2003, pp. 10-11.

(Continued)

*Primary Examiner*—A. Michael Chambers
(74) *Attorney, Agent, or Firm*—Sheridan Ross P.C.

(57) ABSTRACT

The present invention generally relates to a locking apparatus adapted to interface with a valve and to selectively secure the valve in an open or closed position. More specifically, a valve handle lock is provided which is tamper resistant and is generally capable of use with valves produced by many manufacturers. The present invention further includes a locking mechanism that shrouds a portion of the valve handle attachment hardware and which can be used in conjunction with a typical padlock or other type of securement mechanism.

20 Claims, 8 Drawing Sheets

U.S. PATENT DOCUMENTS

| | | |
|---|---|---|
| D358,455 S | 5/1995 | Kieper ........................ D23/249 |
| 5,427,135 A | 6/1995 | Kieper ........................ 137/385 |
| 5,598,724 A | 2/1997 | Primeau ........................ 70/177 |
| 5,785,074 A | 7/1998 | Kieper ........................ 137/68.11 |
| 6,189,350 B1 | 2/2001 | Nishimura et al. ........... 70/180 |
| 6,209,574 B1 * | 4/2001 | Prewitt ........................ 137/382 |
| 6,354,116 B1 | 3/2002 | Drake ........................ 70/178 |
| 6,453,707 B1 | 9/2002 | Nishimura et al. ........... 70/180 |
| 2003/0024284 A1 | 2/2003 | Erickson ........................ 70/177 |

OTHER PUBLICATIONS

"Full Port Locking Handle Ball Valves"; *Boshart Industries, Inc.*; see: www.boshart.com/catalogue/plumbing/valves/ballvalves.pdf; p. 8; website accessed Feb. 11, 2003.

* cited by examiner

APPARATUS AND METHOD FOR SELECTIVELY SECURING A VALVE IN AN OPEN OR CLOSED POSITION

CROSS REFERENCE TO RELATED APPLICATIONS

The present invention claims priority to U.S. Provisional Patent Application Ser. No. 60/451,098, having a filing date of Feb. 28, 2003, and is incorporated herein in its entirety by reference.

FIELD OF THE INVENTION

The present invention generally relates to a locking apparatus adapted to interface with valve handles which are used to selectively open and close a valve used in a pipeline or other fluid conduit. More specifically, a valve handle lock is provided which is tamper resistant and is capable of use with valves produced by many manufacturers, and which can be used to lock the valve in either an open or closed position.

BACKGROUND OF THE INVENTION

Ball valves, gate valves and other similar mechanisms are used commonly in flow applications such as fire systems, refineries, power plants, etc. Ball valves generally employ a "T" shaped or lever handle to allow a user to selectively open and close the valve. Many state and municipal codes require that the valves are positioned in a predetermined location, and often require that the valve remain in the "open" position thereby guaranteeing that water will be available when it is needed. It is conceivable that a terrorist or criminal could turn the valve to the closed position and light a fire, thereby wasting precious time of the fire fighters and putting lives at risk.

Furthermore, with the risk of increased terrorist activity, there is an increased concern regarding the safety of municipal water treatment facilities, and the ability to safely prevent the introduction of a deadly biological or chemical reagant. Thus, there is an increased need to provide a locking mechanism which is simplistic in design, relatively inexpensive and can be placed on valve assemblies to prevent the unauthorized opening or closing of the valve.

Valve locks are known in the art and are used widely. However, the majority of locks in use today are not tamper-resistant. Most valve handles are interconnected to a valve body by way of a nut. Generally, available locks do not protect the nut from tampering or being removed. That is, one can simply bypass many locks by loosening the nut and removing the handle. The open/closing mechanism is then exposed and capable of being selectively altered with commonly used tools. Alternatively, maintenance personnel routinely disconnect the handle thereby "locking" the valve in a predetermined position. However, simple tools can still be used to adjust the valve position or often the handles become misplaced.

Furthermore, some valves may include locks which are designed specifically for a given model and size of valve and associated handle. These locks are not adapted to be used with valves constructed by other manufacturers. Moreover, many locks require some alteration of the valve body, handle, or both, which is not practical.

Thus, there is a long felt need in the field of fire prevention, plumbing, terrorism prevention, and law enforcement (statutory water restrictions) to provide a tamper-resistant valve locking mechanism that is cost effective, easy to use and manufacture, and is adapted to be used with many brands and sizes of valves.

SUMMARY OF THE INVENTION

It is thus one aspect of the present invention to provide a valve lock which is tamper resistant. Preferably, the handle interconnection nut of many valves is shrouded whereby removal or turning of the nut is prevented. In a related embodiment, the locking mechanism is also shrouded or integral to the apparatus thereby further preventing tampering with bolt cutters for example. More specifically, in one embodiment of the present invention a shroud is provided which fits over the valve handle and attachment hardware, and which has two opposing apertures on a lower side which receives a typical padlock which can be selectively opened or closed, and which can be opened with a key or combination.

It is another aspect of the present invention to provide a valve lock which is strong, durable, and difficult to deform. Many locks can be easily circumvented by bending or breaking the mechanism with simple tools such that the handle can be rotated. The present invention is preferably constructed from stainless steel, thereby also preventing corrosion. However, one skilled in the art will appreciate that the lock may be constructed from any number of materials such as graphite, composite, plastic, vulcanized rubber, brass, copper, Inconel, iron, aluminum, etc.

It is yet another aspect of the present invention to provide a lock in a variety of sizes and configurations such that it is capable of being used on various brands of valves. In addition, one skilled in the art will appreciate that the present invention is well suited to be painted, etched, engraved, etc. with warnings, advertisements, instructions, etc. Moreover, the invention may be formed in a plurality of ornamental designs such as the head of an alligator or saber-toothed cat.

It is still yet another aspect of the present invention to provide a lock that is cost effective to manufacture. It is envisioned that locks of this type may be more frequently required by law. For example, new houses in many areas of the United States are required to incorporate back-flow prevention means, thereby preventing would-be terrorists from contaminating a city's water supply from the privacy of their own home. In addition, many portions of the United States frequently experience droughts and water use restrictions such as lawn watering bans. Individuals who break these restrictions under the cover of darkness with a timer could awake to find their water supply locked closed, wherein an official would be required to unlock the valve to restore service. The present invention is easily machined or formed from the parent material thereby reducing costs. In addition, the present invention preferably does not require retro-fits of the valve; it simply slips on. The locking mechanism preferably interfaces primarily with the lock body therefore no handle holes would be required.

Thus, it is one aspect of the present invention to provide a tamper resistant valve locking assembly adapted for use with a valve which includes a handle and handle stop, comprising:

a locking assembly front end, a rear end, and a first lateral edge and a second lateral edge extending therebetween which define a shroud;

a first lateral support extending downward from said first lateral edge, and a second lateral support extending downward from said second lateral edge;

a forward support member extending downwardly from said front end of said locking assembly and comprising a handle aperture adapted to receive at least a portion of the valve handle;

at least one handle stop engagement means positioned on at least one of said first lateral support and said second lateral support, and which is adapted to contact the valve handle stop, wherein said locking assembly is substantially impeded from at least one direction of travel; and at least one aperture positioned in at least one of said first lateral support and said second lateral support which is adapted to receive a securement device which can be selectively interconnected to said locking assembly, wherein when said securement device is interconnected to said locking assembly the valve handle is substantially prevented from rotation.

It is a separate aspect of the present invention to provide a tamper resistant valve locking assembly adapted to be used with a valve which includes a handle and first and second handle stops, comprising:

a locking assembly front end, a rear end and a first lateral edge and a second lateral edge extending therebetween which define a shroud;

a first lateral support extending downward from said first lateral edge, and a second lateral support extending downward from said second lateral edge;

a forward support member extending downwardly from said front end of said locking assembly, said forward support member comprising a means for receiving a portion of the handle of the valve;

a first handle stop cut-out positioned in said first lateral support which is adapted to contact the first handle stop to lock the valve in a closed position, and a second handle stop cut-out positioned in said second lateral support which is adapted to contact the second handle stop to lock the valve in an open position; and at least one lock aperture positioned in said first lateral support and said second lateral support, wherein said at least one lock aperture is adapted to receive a securement device which can be selectively interconnected to said locking assembly to prevent removal from said valve.

It is yet a separate aspect of the present invention to provide a method of selectively securing a valve in a first open position or a second closed position, comprising the steps of:

(a) providing a locking mechanism, the locking mechanism comprising a locking assembly front end, a rear end, and a first lateral edge and a second lateral edge extending therebetween which define a shroud;

a first lateral support extending downward from said first lateral edge, and a second lateral support extending downward from said second lateral edge;

a forward support member extending downwardly from said front end of said locking assembly and comprising a handle aperture adapted to receive a handle of the valve;

a first handle stop cut-out positioned in said first lateral support which is adapted to contact a first handle stop on the valve to lock the valve in a closed position, and a second handle stop cut-out positioned in said second lateral support which is adapted to contact a second handle stop on the valve to lock the valve in an open position; and at least one aperture positioned in said first lateral support and said second lateral support which is adapted to receive a securement device;

(b) inserting the handle of the valve into the handle aperture of the forward support member;

(c) sliding the handle into handle aperture and moving the shroud into position until the first handle stop cut-out contacts the first handle stop to lock the valve in a closed position, or until the second handle stop cut-out contacts the second handle stop to lock the valve in an open position; and (d) securing a securement device through the at least one aperture positioned in said first lateral support and said second lateral support.

BRIEF DESCRIPTION OF THE DRAWINGS

FIGS. 2 and 2A are perspective views of a first embodiment of the present invention for a locking assembly for a typical T-handle type valve shown in FIG. 1;

DETAILED DESCRIPTION

Figure 1:
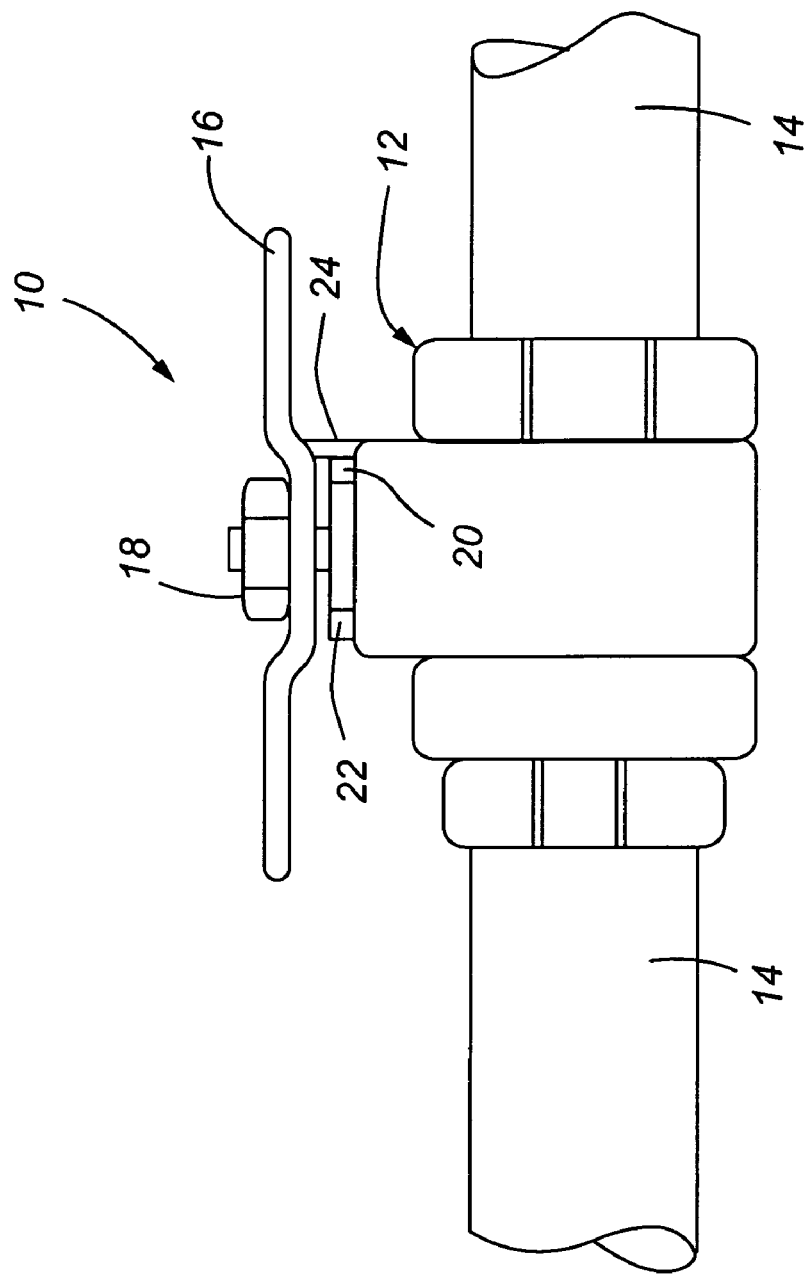
FIG. 1 is a side elevation view of a T-handle type valve and pipe assembly.

Referring now to FIG. 1., a typical "T-handle" type valve and pipe assembly 10 is shown. The T-handle valve and pipe assembly 10 includes a T-handle valve 12 interconnected to segments of pipe 14 on either side of the T-handle valve 12. As shown in FIG. 1, the T-handle valve 12 includes a rotatable handle 16 that selectively controls the flow through the T-handle valve 12. The rotatable handle 16 is typically attached the T-handle valve 12 by valve handle attachment hardware 18.

The T-handle valve 12 also includes a first valve handle stop 20 to limit the rotation of the rotatable handle 16 to a full-open position, and a second valve handle stop 22 to limit the rotation of the rotatable handle 16 to a closed position. In addition, the rotatable handle 16 includes a stop intercept 24 projecting from the rotatable handle 16, wherein the stop intercept 24 contacts either the first or second handle stops 20, 22 to limit the rotation of the rotatable handle 16.

Figure 2:
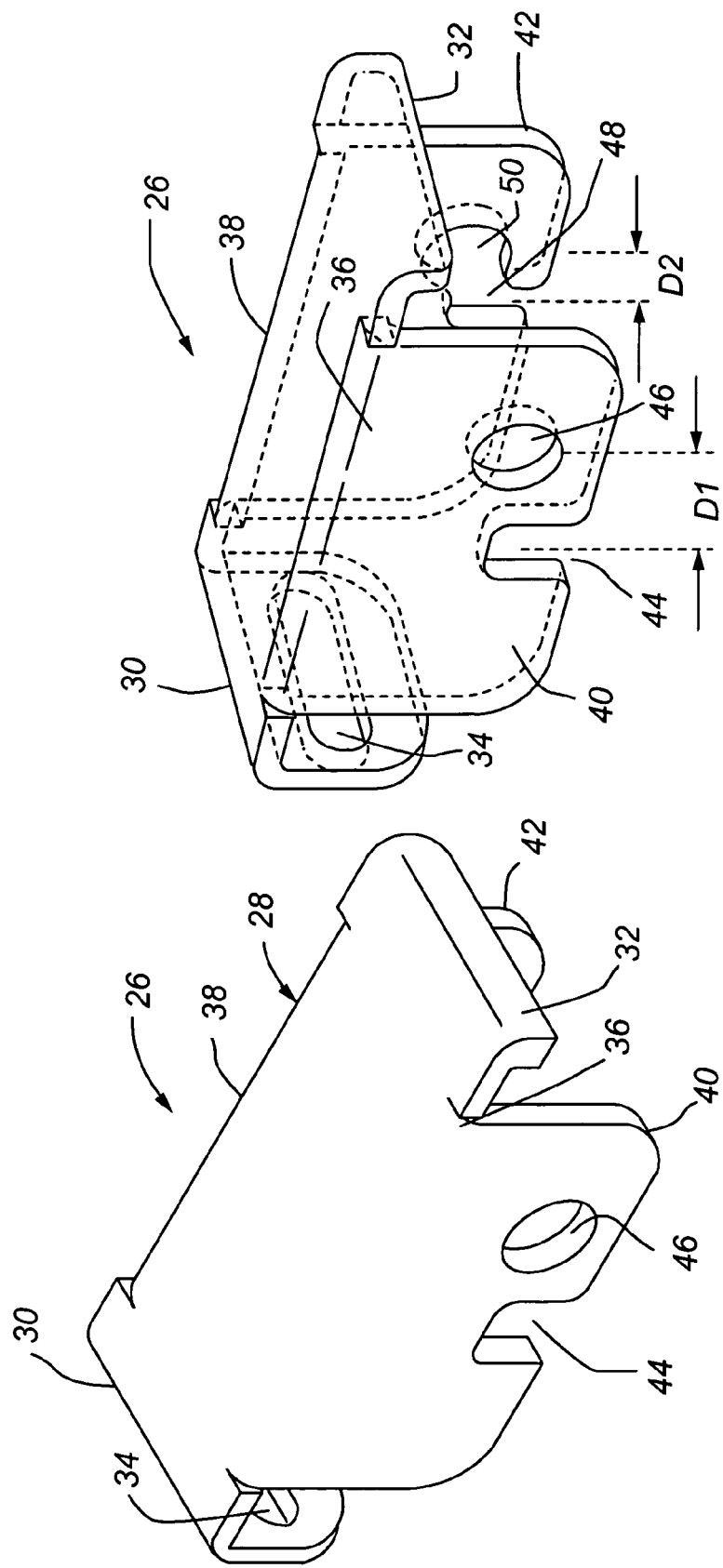

Referring now to FIGS. 2 and 2A, perspective views of one embodiment of the locking assembly 26 of the present invention is shown. The locking assembly 26 is adapted to fit over the rotatable handle 16 of the T-handle valve 12. The locking assembly 26 shrouds the valve handle attachment hardware 18, such as a nut, that is used to operably interconnect the rotatable handle 16 to the flow opening/closing mechanism of the T-handle valve 12. The locking assembly 26 features a lock shroud 28 that includes a lock front end 30 and a lock rear end 32. The lock front end 30 includes a handle aperture 34 that is sized to receive at least a portion of the rotatable handle 16. In addition, the lock shroud 28 includes a first lock lateral edge 36 and a second lock lateral edge 38.

Still referring to FIGS. 2 and 2A, a first lateral support 40 extends down from the first lock lateral edge 36. The first lateral support 40 includes a first handle stop cut-out 44 and a first padlock aperture 46, where the first handle stop cut-out 44 is sized to slip over a valve handle stop of the T-handle valve 12. For the typical T-handle valve 12 shown in FIG. 1, the first handle stop cut-out 44 is sized to fit over the first valve handle stop 20. For the embodiment of the locking assembly 26 shown in FIGS. 2 and 2A, the center of the first handle stop cut-out 44 is spaced apart a first distance $D_1$ from the center of the first padlock aperture 46.

Similar to the structure extending down from the first lock lateral edge 36, on an opposing side of the locking assembly 26, a second lateral support 42 extends down from the second lock lateral edge 38. The second lateral support 42 includes a second handle stop cut-out 48 and a second padlock aperture 50, where the second handle stop cut-out 48 is sized to slip over a valve handle stop of the T-handle valve 12. For the typical T-handle valve 12 shown in FIG. 1, the second handle stop cut-out 48 is sized to fit over the second valve handle stop 22. The locking capability of the locking assembly 26 is provided by the second padlock aperture 50 that is substantially aligned with the first padlock aperture 46, such that a padlock may be passed through both the first and second padlock apertures 46 and 50 at the same time and then locked. In addition, for the embodiment of the locking assembly 26 shown in FIGS. 2 and 2A, the center of the second handle stop cut-out 48 is spaced apart a second distance $D_2$ from the center of the second padlock aperture 50, where distance $D_1$, is greater than distance $D_2$.

Figure 3:
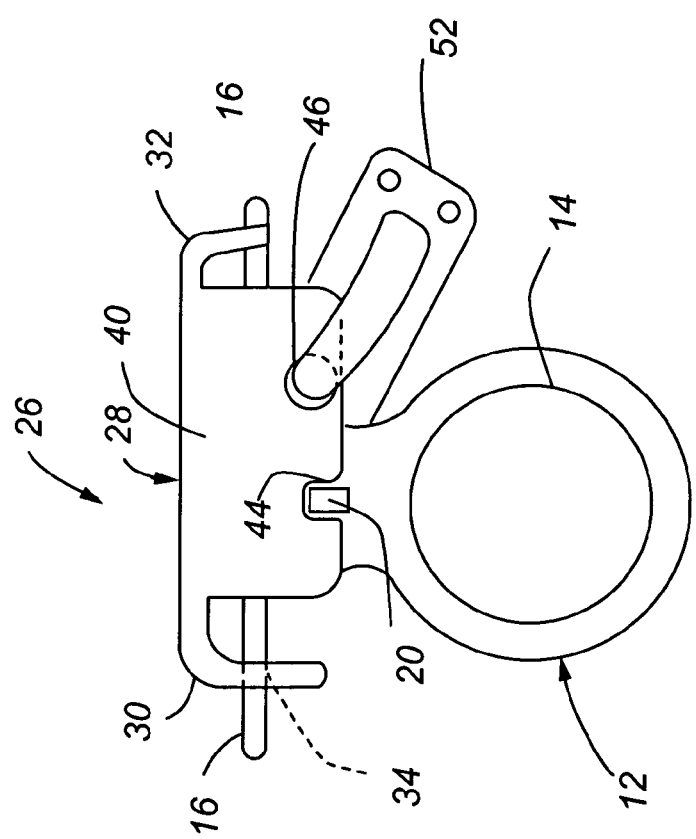
FIG. 3 is side elevation view of the locking assembly of FIGS. 2 and 2A shown with the valve of FIG. 1 having its handle locked in the closed position.

Referring now to FIG. 3, the locking assembly 26 is shown in combination with typical T-handle valve 12 shown in FIG. 1, where the valve 12 is being locked in the closed position. In use, to secure the location of the rotatable handle 16 of the T-handle valve 12, the user initially positions the rotatable handle 16 through a handle aperture 34 incorporated into the lock front end 30 of the locking assembly 26. The handle aperture 34 and the lock front end 30 are designed to prevent upward removal of the rotatable handle 16 from the T-handle valve 12. Next, the lock shroud 28 is placed over the valve handle attachment hardware 18 and the first handle stop cut-out 44 is placed over the first handle stop 20. More particularly, for the typical T-handle valve 12 shown in FIG. 1, the when the rotatable handle 16 is in the closed position, the stop intercept 24 of the rotatable handle 16 is contacting the second valve handle stop 22, and the first handle stop cut-out 44 of the locking assembly 26 is placed over the first handle stop 20. A lock can then be passed through the first and second padlock apertures 46 and 50. The first handle stop cut-out 44 prevents the lock shroud 28 from moving back and forth because it is restricted by the first handle stop 20. In addition, the rotatable handle 16 within the handle aperture 34 prevents the lock front end 30 from lifting off of the rotatable handle 16, while the lock rear end 32 is prevented from being lifted off of the rotatable handle 16 because the padlock 52 or other securing mechanism is under the rotatable handle 16.

Figure 4:
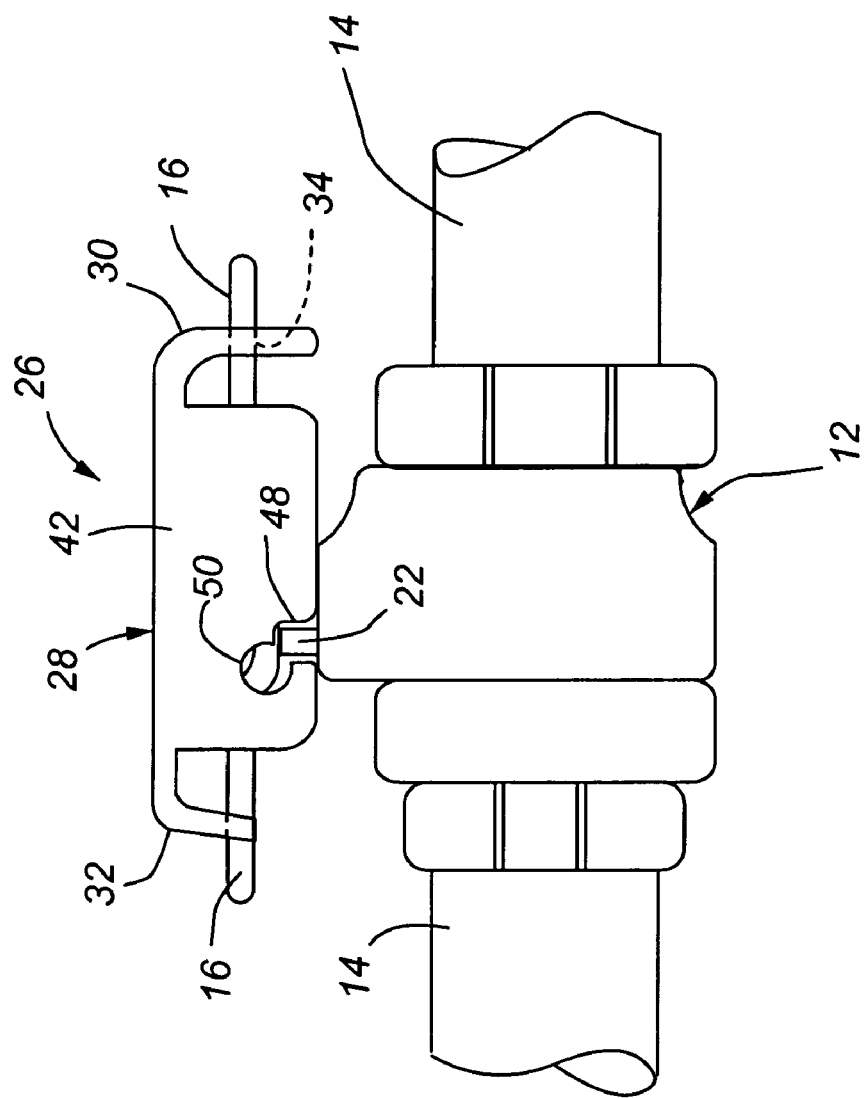
FIG. 4 is side elevation view of the locking assembly of FIGS. 2 and 2A shown with the valve of FIG. 1 having its handle locked in the open position.

Referring now to FIG. 4, the locking assembly 26 is shown in combination with typical T-handle valve 12 shown in FIG. 1, where the valve 12 is being locked in the full-open flow position. In use, to secure the location of the rotatable handle 16 of the T-handle valve 12, the user initially positions the rotatable handle 16 through the handle aperture 34 incorporated into the lock front end 30 of the locking assembly 26. Next, the lock shroud 28 is placed over the valve handle attachment hardware 18 and the second handle stop cut-out 48 is placed over the second handle stop 22. More particularly, for the typical T-handle valve 12 shown in FIG. 1, the when the rotatable handle 16 is in the open position, the stop intercept 24 of the rotatable handle 16 is contacting the first valve handle stop 20, and the second handle stop cut-out 48 of the locking assembly 26 is placed over the second handle stop 22. A lock can then be passed through the first and second padlock apertures 46 and 50. The second handle stop cut-out 48 prevents the lock shroud 28 from moving back and forth because it is restricted by the second handle stop 22. In addition, the rotatable handle 16 within the handle aperture 34 prevents the front end from lifting off of the rotatable handle 16, while the lock rear end 32 is prevented from being lifted off of the rotatable handle 16 because the padlock is under the rotatable handle 16.

Figure 5:
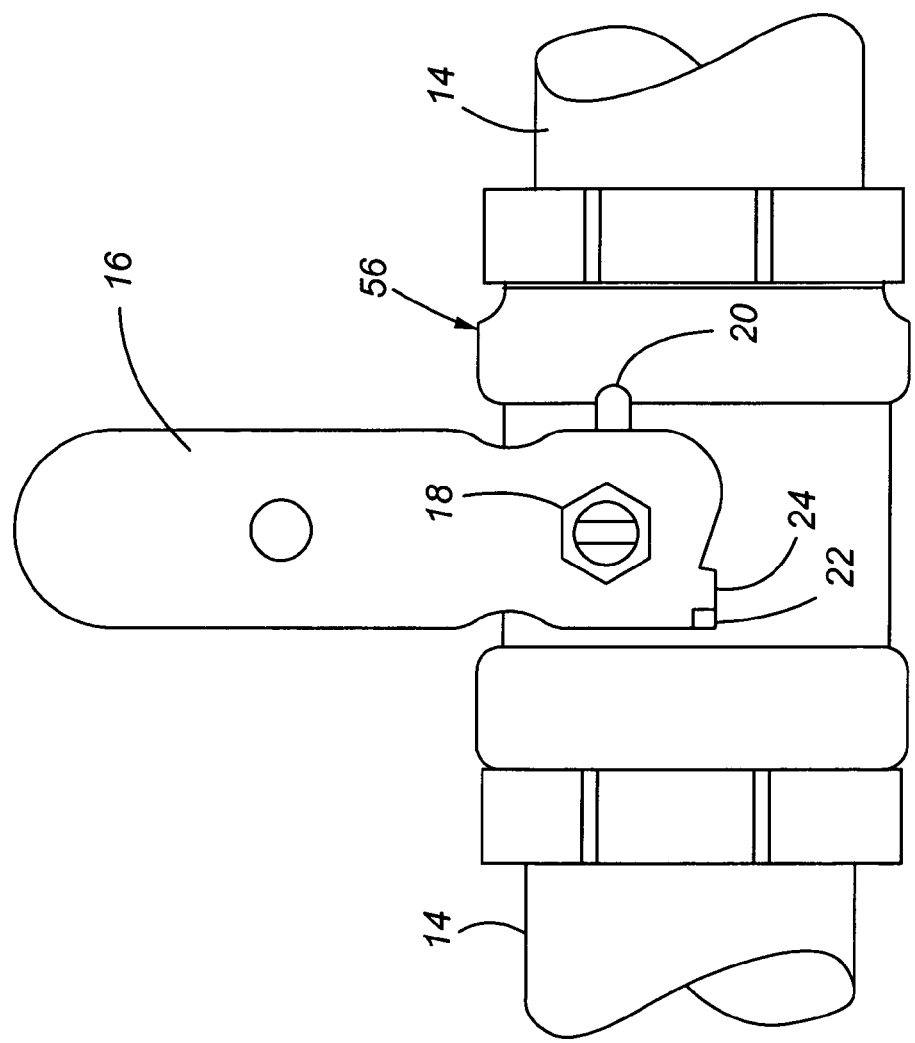
FIG. 5 is a side elevation view of a lever handle type valve and pipe assembly.

Referring now to FIG. 5, a typical "lever-handle" type valve and pipe assembly 54 is shown. The lever-handle valve and pipe assembly 54 includes a lever-handle valve 56 interconnected to segments of pipe 14 on either side of the lever-handle valve 56. As shown in FIG. 5, the lever-handle valve 56 includes a rotatable handle 16 that selectively controls the flow through the lever-handle valve 56. The rotatable handle 16 is typically attached the lever-handle valve 56 by valve handle attachment hardware 18.

As with the T-handle valve 12, the lever-handle valve 56 also includes a first valve handle stop 20 to limit the rotation of the rotatable handle 16 to a full-open position, and a second valve handle stop 22 to limit the rotation of the rotatable handle 16 to a closed position. In addition, the rotatable handle 16 includes a stop intercept 24 projecting from the rotatable handle 16, wherein the stop intercept 24 contacts either the first or second handle stops 20, 22 to limit the rotation of the rotatable handle 16.

Figure 6:
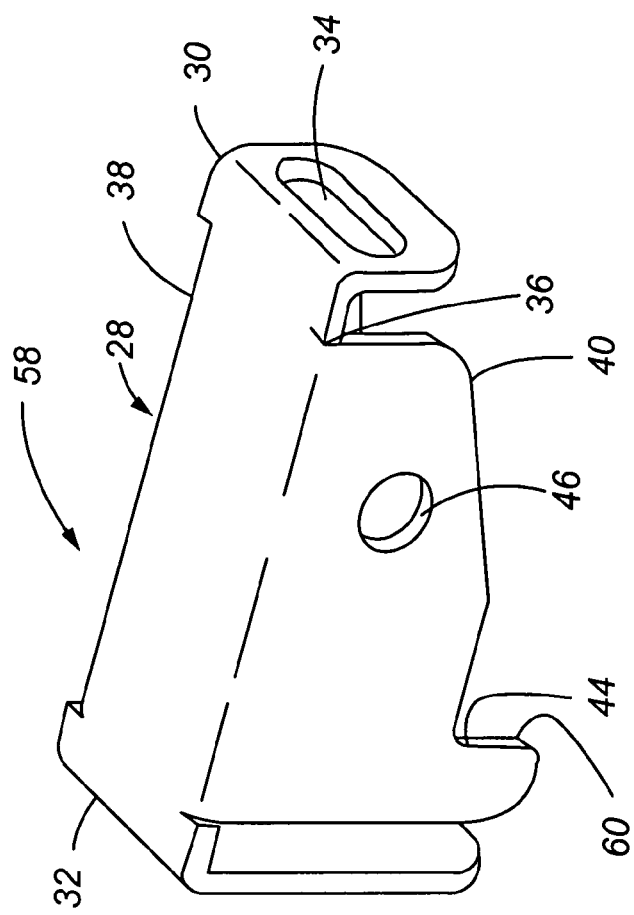
FIGS. 6 and 6A are perspective views of a second embodiment of the present invention for a locking assembly for a typical lever handle type valve shown in FIG. 5.
Figure 6A:
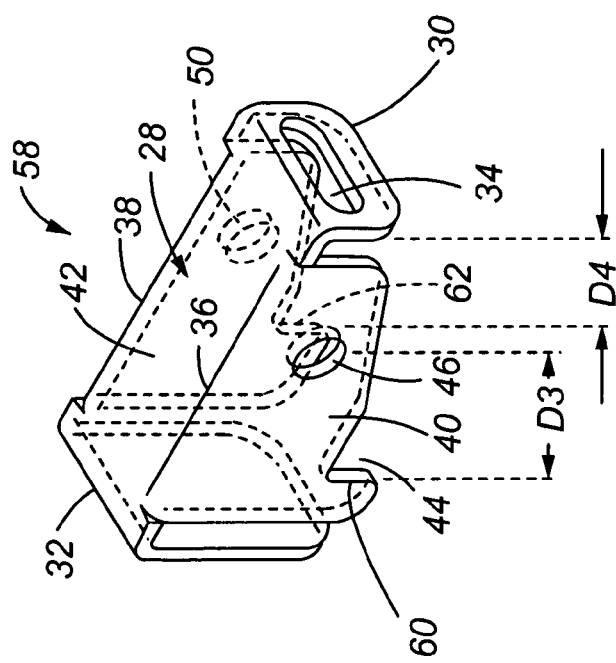

Referring now to FIGS. 6 and 6A, perspective views of an alternate embodiment of a valve lock is shown, where the locking assembly 58 of the present invention is adapted to fit over the rotatable handle 16 of a lever handle valve like the lever-handle valve 56 illustrated in FIG. 5. The locking assembly 58 shrouds the valve handle attachment hardware 18 that is used to operably interconnect the rotatable handle 16 to the flow opening/closing mechanism of the lever-handle valve 56. The locking assembly 58 features a lock shroud 28 that includes a lock front end 30 and a lock rear end 32. The lock front end 30 includes a handle aperture 34 that is sized to receive at least a portion of the rotatable handle 16. In addition, the lock shroud 28 includes a first lock lateral edge 36 and a second lock lateral edge 38.

Still referring to FIGS. 6 and 6A, a first lateral support 40 extends down from the first lock lateral edge 36. The first lateral support 40 includes a first handle stop cut-out 44 and a first padlock aperture 46, where the first handle stop cut-out 44 is sized to slip over a valve handle stop of a lever-handle valve. For the typical lever-handle valve 56 shown in FIG. 5, the first handle stop cut-out 44 is sized to fit over the first valve handle stop 20. For the embodiment of the locking assembly 58 shown in FIGS. 6 and 6A, a first shoulder 60 of the first handle stop cut-out 44 is spaced apart a first distance $D_3$ from the center of the first padlock aperture 46.

Similar to the structure extending down from the first lock lateral edge 36, on an opposing side of the locking assembly 58, a second lateral support 42 extends down from the second lock lateral edge 38. The second lateral support 42 includes a second handle stop cut-out 48 and a second padlock aperture 50, where the second handle stop cut-out 48 is sized to slip over a valve handle stop of the lever-handle valve 56. For the typical lever-handle valve 56 shown in FIG. 5, the second handle stop cut-out 48 is sized to fit over the second valve handle stop 22. The locking capability of the locking assembly 58 is provided by the second padlock aperture 50 that is substantially aligned with the first padlock aperture 46, such that a padlock may be passed through both the first and second padlock apertures 46 and 50 at the same time and then locked. In addition, for the embodiment of the locking assembly 58 shown in FIGS. 6 and 6A, a second shoulder 62 of the second handle stop cut-out 48 is spaced apart a second distance $D_4$ from the center of the second padlock aperture 50, where distance $D_3$ is greater than distance $D_4$.

Figure 7:
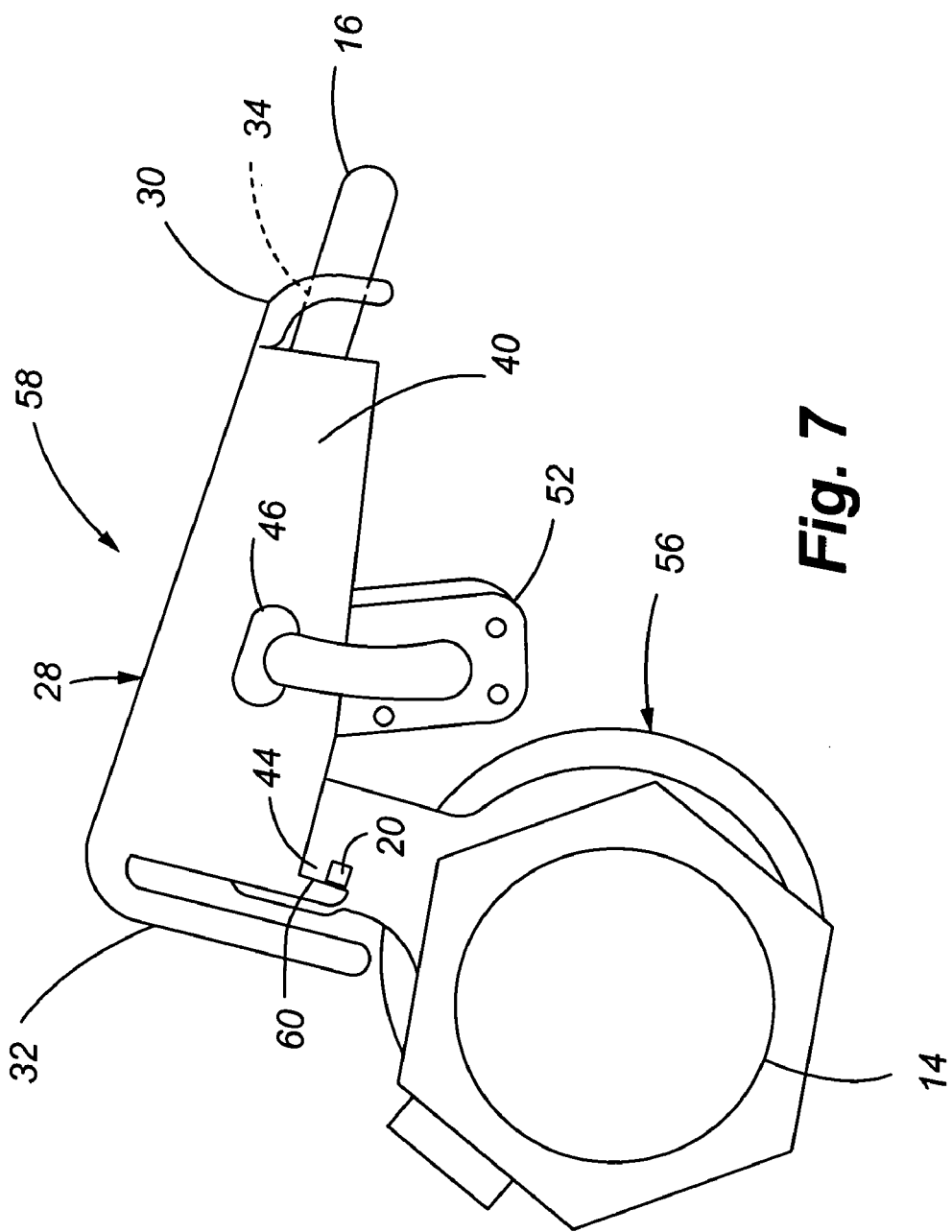
FIG. 7 is side elevation view of the locking assembly of FIGS. 6 and 6A shown with the valve of FIG. 5 having its handle locked in the closed position.

Referring now to FIG. 7, the locking assembly 58 is shown in combination with typical lever-handle valve 56 shown in FIG. 5, where the valve 56 is being locked in the closed position. In use, to secure the location of the rotatable handle 16 of the lever-handle valve 56, the user initially positions the rotatable handle 16 through the handle aperture 34 incorporated into the lock front end 30 of the locking assembly 58. The handle aperture 34 and the lock front end 30 are designed to prevent upward removal of the rotatable handle 16 from the lever-handle valve 56. Next, the lock shroud 28 is placed over the valve handle attachment hardware 18 and the first handle stop cut-out 44 is placed over the first handle stop 20. More particularly, for the typical lever handle valve 56 shown in FIG. 5, the when the rotatable handle 16 is in the closed position, the stop intercept 24 of the rotatable handle 16 is contacting the second valve handle stop 22, and the first handle stop cut-out 44 of the locking assembly 58 is placed over the first handle stop 20. A lock can then be passed through the first and second padlock apertures 46 and 50. The first shoulder 60 of the first handle stop cut-out 44 prevents the lock shroud 28 from moving back and forth because it is restricted by the first handle stop 20. In addition, the rotatable handle 16 within the handle aperture 34 prevents the lock front end 30 from lifting off of the rotatable handle 16, while the lock rear end 32 is prevented from being lifted off of the rotatable handle 16 because when locked, the padlock 52 is under the rotatable handle 16.

Figure 8:
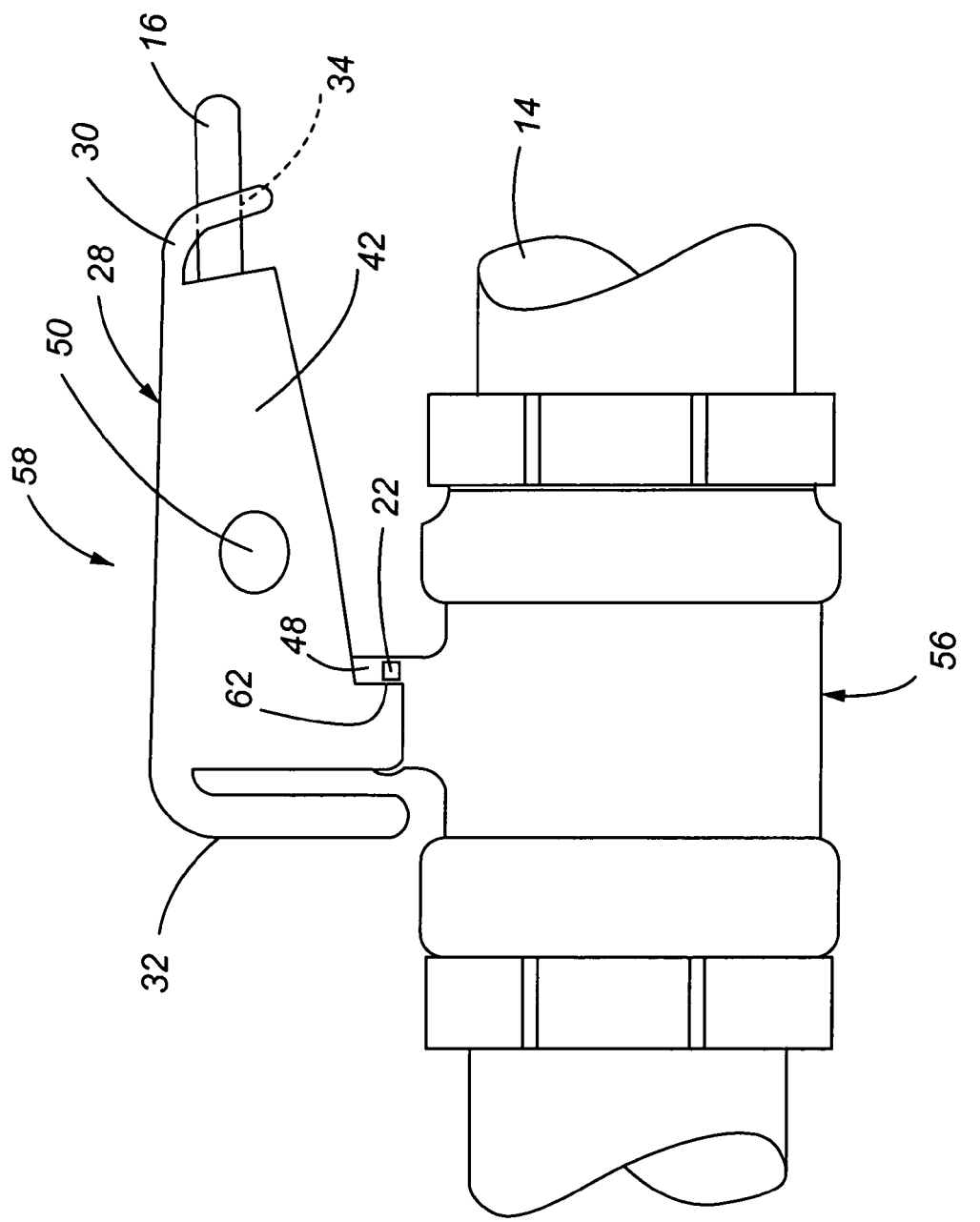
FIG. 8 is side elevation view of the locking assembly of FIGS. 6 and 6A shown with the valve of FIG. 5 having its handle locked in the open position.

Referring now to FIG. 8, the locking assembly 58 is shown in combination with typical lever-handle valve 56 shown in FIG. 5, where the valve 56 is being locked in the full-open flow position. In use, to secure the location of the rotatable handle 16 of the lever-handle valve 56, the user initially positions the rotatable handle 16 through the handle aperture 34 incorporated into the lock front end 30 of the locking assembly 58. Next, the lock shroud 28 is placed over the valve handle attachment hardware 18 and the second handle stop cut-out 48 is placed over the second handle stop 22. More particularly, for the typical lever handle valve 56 shown in FIG. 5, the when the rotatable handle 16 is in the full-open flow position, the stop intercept 24 of the rotatable handle 16 is contacting the first valve handle stop 20, and the second handle stop cut-out 48 of the locking assembly 58 is placed over the second handle stop 22. A lock can then be passed through the first and second padlock apertures 46 and 50. The second shoulder 62 of the second handle stop cut-out 48 prevents the lock shroud 28 from moving back and forth because it is restricted by the second handle stop 22. In addition, the rotatable handle 16 within the handle aperture 34 prevents the front end from lifting off of the rotatable handle 16, while the lock rear end 32 is prevented from being lifted off of the rotatable handle 16 because when locked, the padlock 52 is under the rotatable handle 16.

For both of the locking assemblies 26 and 58, a different mechanism other than a handle aperture 34 may be used to secure the lock front end 30 to the rotatable handle 16. For example, a hinged and/or slideable sleeve (not shown) may be interconnected to the lock front end 30 to serve as a means for receiving the rotatable handle 16. Such a hinged and/or slideable sleeve may include an aperture to cooperate with the first padlock aperture 46 and/or the second padlock aperture 50, such that the hinged and/or slideable sleeve or similar means is secured upon using a locking or securing mechanism, such as a padlock or combination lock, with the locking assemblies 26 or 58.

The locking assemblies 26 and 58 lend themselves to being used with a variety of securing mechanisms, such as a padlock, combination lock, or a lock with a breakable seal, such that the valve can be sealed, but still accessible in emergency situations. The locking assemblies further offer added security to the actual locking mechanism employed, because by placing a conventional padlock below the locking assemblies 26 and 58, the lock is substantially protected from access by bolt cutters, hack saws, etc.

As will be appreciated by one skilled in the art, many varieties of the locking mechanisms may be employed with the present invention that will achieve the same result. Moreover, the lock, as shown in the figures, is designed to secure the valve in an open or closed position depending on the specific application.

To assist in the understanding of the present invention the following list of components and associated numbering found in the drawings is provided herein:

| Number | Component |
|--------|-----------|
| 10 | T-handle type valve and pipe assembly |
| 12 | T-handle valve |
| 14 | Pipe |
| 16 | Rotatable handle |
| 18 | Valve handle attachment hardware |
| 20 | First valve handle stop |
| 22 | Second valve handle stop |
| 24 | Stop intercept |
| 26 | Locking assembly (to T-handle type valve) |
| 28 | Lock shroud |
| 30 | Lock front end |
| 32 | Lock rear end |
| 34 | Handle aperture |
| 36 | First lock lateral edge |
| 38 | Second lock lateral edge |
| 40 | First lateral support |
| 42 | Second lateral support |
| 44 | First handle stop cut-out |
| 46 | First padlock aperture |
| 48 | Second handle stop cut-out |
| 50 | Second padlock aperture |
| 52 | Securing mechanism |
| 54 | Lever handle type valve and pipe assembly |
| 56 | Lever handle valve |
| 58 | Locking assembly (to lever handle type valve) |
| 60 | First shoulder (to first handle stop cut-out) |
| 62 | Second shoulder (of second handle stop cut-out) |

While various embodiment of the present invention have been described in detail, it is apparent that modifications and abdications of those embodiments will occur to those skilled in the art. However, it is to be expressly understood that such modifications abdications are within the scope and spirit of the present invention, as set forth in the following claims.

What is claimed is:

1. A method of selectively securing a valve in a first open position or a second closed position, comprising the steps of:
   (a) providing a locking mechanism, the locking mechanism comprising a locking assembly front end, a rear end, and a first lateral edge and a second lateral edge extending therebetween which define a shroud;
      a first lateral support extending downward from said first lateral edge, and a second lateral support extending downward from said second lateral edge;
      a forward support member extending downwardly from said front end of said locking assembly and comprising a handle aperture adapted to receive a handle of the valve;
      a first handle stop cut-out positioned in said first lateral support which is adapted to contact a first handle stop on the valve to lock the valve in a closed position, and a second handle stop cut-out positioned in said second lateral support which is adapted to contact a second handle stop on the valve to lock the valve in an open position; and
      at least one aperture positioned in said first lateral support and said second lateral support which is adapted to receive a securement device;
   (b) inserting the handle of the valve into the handle aperture of the forward support member;
   (c) sliding the handle into handle aperture and moving the shroud into position until the first handle stop cut-out contacts the first handle stop to lock the valve in a closed position, or until the second handle stop cut-out contacts the second handle stop to lock the valve in an open position; and
   (d) securing a securement device through the at least one aperture positioned in said first lateral support and said second lateral support.

2. The method as claimed in claim 1, wherein the securement device comprises a padlock.

3. A tamper resistant valve locking assembly adapted for use with a valve which includes a handle and handle stop, comprising:
   a locking assembly front end, a rear end and a first lateral edge and a second lateral edge extending therebetween which define a shroud;
   a first lateral support extending downward from said first lateral edge, and a second lateral support extending downward from said second lateral edge;
   a forward support member extending downwardly from said front end of said locking assembly and comprising a handle aperture adapted to receive at least a portion of the valve handle;
   at least one handle stop engagement means positioned on at least one of said first lateral support and said second lateral support, and which is adapted to contact the valve handle stop, wherein said locking assembly is substantially impeded from at least one direction of travel; and
   at least one aperture positioned in at least one of said first lateral support and said second lateral support which is adapted to receive a securement device which can be selectively interconnected to said locking assembly, wherein when said securement device is interconnected to said locking assembly the valve handle is substantially prevented from rotation.

4. The locking assembly of claim 3, wherein said at least one handle stop engagement means comprises a cut-out sized to receive said valve handle stop.

5. The locking assembly of claim 3, wherein said securement device comprises a padlock.

6. The locking assembly of claim 3, wherein said shroud comprises a substantially planar upper surface which covers any attachment hardware used to interconnect said valve handle to said valve.

7. The locking assembly of claim 3, wherein said shroud, said first lateral support and said second lateral support substantially enclose the valve handle.

8. The locking assembly of claim 3, wherein said locking assembly is adapted for interconnection to the valve with the valve in either an open or a closed position.

9. The locking assembly of claim 3, wherein said rear end of said locking assembly further comprises a rearward support member which extends substantially downwardly to substantially restrict access to any valve attachment hardware.

10. The locking assembly of claim 3, wherein said locking assembly is comprised of a one-piece metallic material.

11. The locking assembly of claim 3, wherein said securement device comprises a bolt with a keyed lock member.

12. A tamper resistant valve locking assembly adapted to be used with a valve which includes a handle and first and second handle stops, comprising:
   a locking assembly front end, a rear end and a first lateral edge and a second lateral edge extending therebetween which define a shroud;
   a first lateral support extending downward from said first lateral edge, and a second lateral support extending downward from said second lateral edge;
   a forward support member extending downwardly from said front end of said locking assembly, said forward support member comprising a means for receiving a portion of the handle of the valve;
   a first handle stop cut-out positioned in said first lateral support which is adapted to contact the first handle stop to lock the valve in a closed position, and a second handle stop cut-out positioned in said second lateral support which is adapted to contact the second handle stop to lock the valve in an open position; and
   at least one lock aperture positioned in said first lateral support and said second lateral support, wherein said at least one lock aperture is adapted to receive a securement device which can be selectively interconnected to said locking assembly to prevent removal from said valve.

13. The locking assembly of claim 12, wherein a center of said first handle stop cut-out is spaced apart a first lateral distance from said at least one lock aperture, and wherein said center of said second handle stop cut-out is spaced apart a second lateral distance from said at least one lock aperture, and wherein said first lateral distance is not equal to said second lateral distance.

14. The locking assembly of claim 12, wherein said first handle stop cut-out includes a first shoulder and said second handle stop cut-out includes a second shoulder.

15. The locking assembly of claim 14, wherein first shoulder is spaced apart a first lateral distance from said at least one lock aperture, and wherein said second shoulder is spaced apart a second lateral distance from said at least one lock aperture, and wherein said first lateral distance is not equal to said second lateral distance.

16. The locking assembly of claim 12, wherein said means for receiving a portion of the handle of the valve comprises an aperture in said forward support member.

17. The locking assembly of claim 12, wherein said securement device comprises a padlock.

18. The locking assembly of claim 12, wherein said shroud, said first lateral support and said second lateral support substantially enclose the valve handle.

19. The locking assembly of claim 12, wherein said rear end of said locking assembly further comprises a rearward support member which extends substantially downwardly to substantially restrict access to any valve attachment hardware.

20. The locking assembly of claim 12, wherein said securement device comprises a bolt with a keyed lock member.

* * * * *